United States Patent Office 3,148,750
Patented Sept. 15, 1964

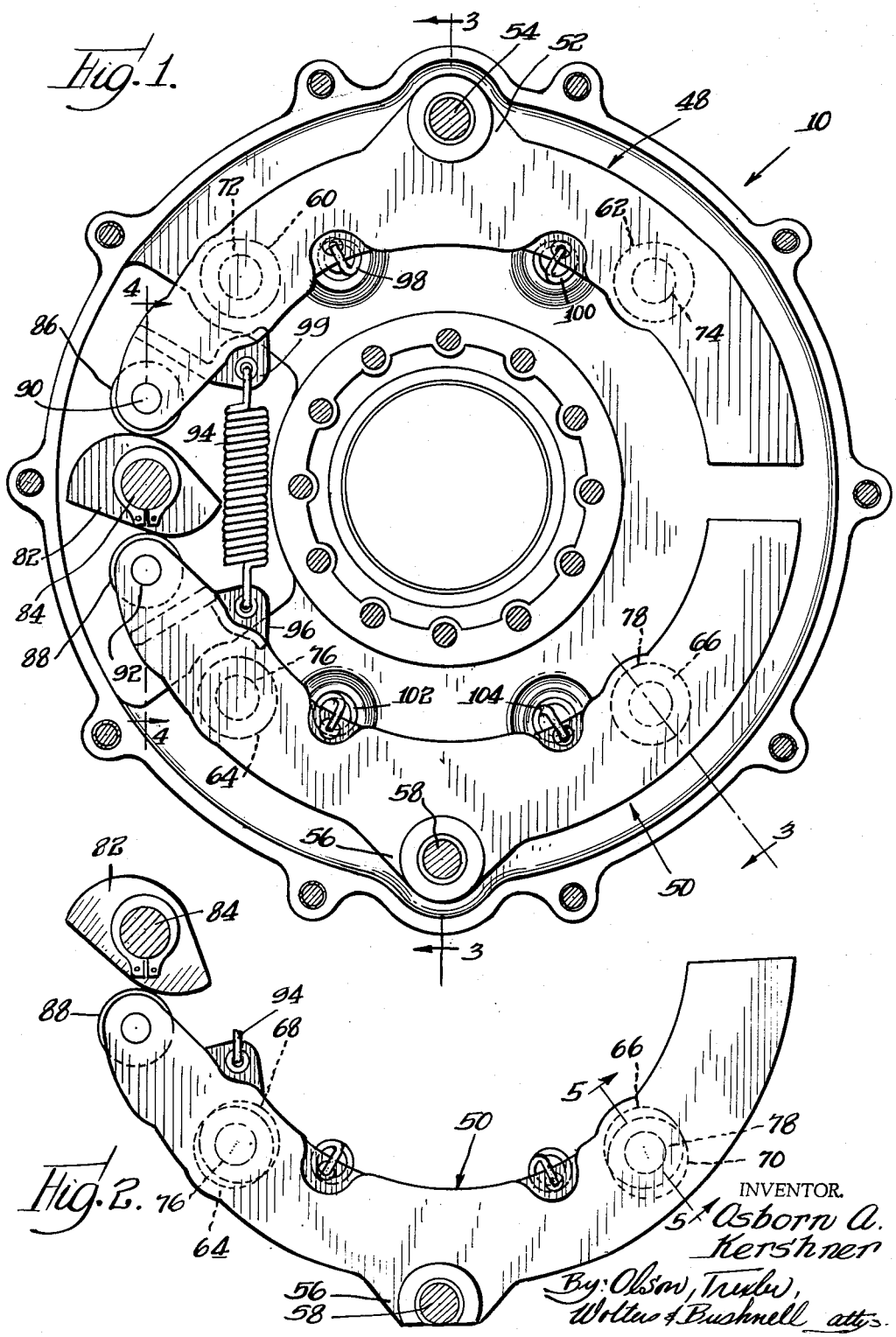

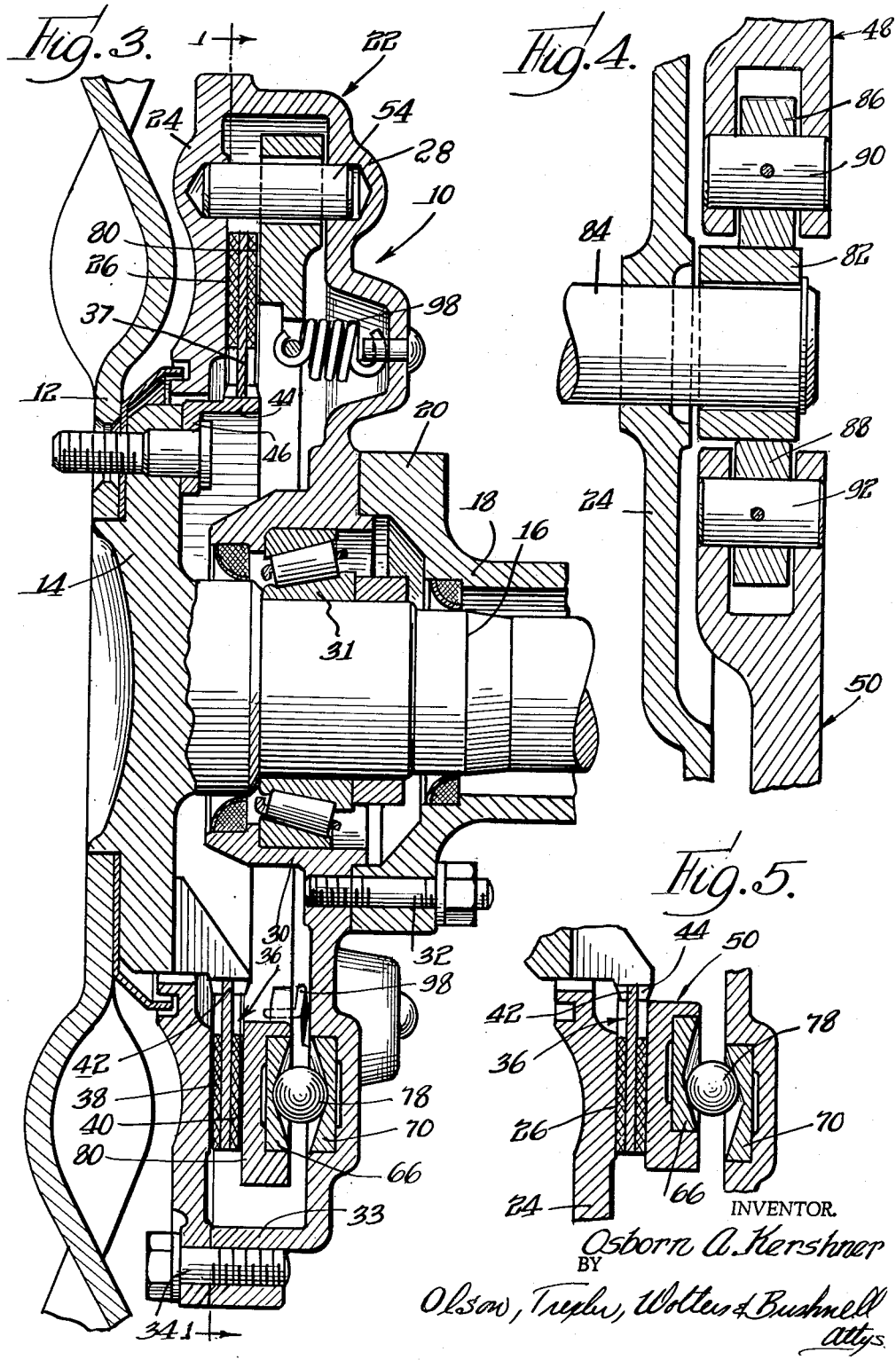

3,148,750
DISC BRAKE INCLUDING A PIVOTALLY MOUNTED, AXIALLY MOVABLE MEMBER
Osborn A. Kershner, St. Joseph, Mich., assignor, by mesne assignments, to Lambert Brake Corporation, St. Joseph, Mich., a corporation of Michigan
Filed Mar. 14, 1962, Ser. No. 179,626
5 Claims. (Cl. 188—72)

The present invention relates to a novel friction device, and more specifically to a novel friction structure or brake capable of controlling or stopping the rotation of a wheel or other rotatable member.

An important object of the present invention is to provide a novel disc brake structure of the type having at least one friction disc connectable with the rotatable part to be controlled and adapted to be clamped against a stationary friction surface for effecting a braking operation, which brake structure is relatively compact and efficient in operation.

A more specific object of the present invention is to provide a novel disc type brake structure having actuating shoe means engageable with the friction disc and constructed and arranged for applying braking pressure to the friction disc in a manner which promotes more efficient operation and reduces wear of the structure.

Other objects and advantages of the present invention will become apparent from the following description and the accompanying drawings wherein:

FIG. 1 is a sectional view of a brake structure incorporating features of the present invention and taken along line 1—1 in FIG. 3;

FIG. 2 is a fragmentary sectional view similar to FIG. 1 but showing the manner in which elements of the structure are manipulated during a braking operation;

FIG. 3 is a partial sectional view taken generally along line 3—3 in FIG. 1;

FIG. 4 is an enlarged fragmentary sectional view taken generally along line 4—4 in FIG. 1; and FIG. 5 is a fragmentary sectional view taken along line 5—5 in FIG. 2.

Referring now more specifically to the drawings wherein like parts are designated by the same numerals throughout the various figures, a brake structure 10 incorporating features of the present invention is shown in FIGS. 1 and 3. In the embodiment shown, the brake structure is associated with and adapted to control a vehicle wheel 12 carried by a hub portion 14 of an axle 16 which is suitably rotatably supported. The axle 16 extends into a fixed tubular member 18 of the vehicle having an enlarged end flange 20 to which the brake structure is connected in the manned described below.

The brake structure 10 includes a housing means 22 which is mounted so as to be fixed against rotation. The housing means comprises a first end wall or portion 24 presenting an inwardly facing flat annular friction surface 26. A second end wall or portion 28 of the housing means is disposed in axially spaced and opposing relationship with respect to the end wall 24 and the friction surface 26. The inner margin of the end wall 28 merges with a hub portion 30 which is suitably secured by bolts 32 to the flange 20. A bearing unit 31 is mounted within the hub portion for rotatably supporting the axle 16. A radially outer margin of the end wall 28 merges with an axially projecting peripheral wall 33 which extends to the end wall 24 and is secured thereto by a plurality of annularly spaced screws 34.

Friction disc means 36 is disposed between the friction surface 26 and the housing end wall 28 for engagement with the friction surface. In the embodiment shown, the friction disc means comprises a single rotary disc 37 having annular bands 38 and 40 of friction material on opposite sides thereof. The disc is provided with a splined inner marginal portion 42 connected with a splined portion 44 of an adaptor member 46 which is secured to the wheel hub 14. The connection between the disc and the adaptor member is such that the disc rotates with the wheel but is free to move axially relative to the adaptor and the friction surface 26 of the housing means. While only a single friction disc is shown in the present embodiment, it is to be understood that the friction disc means could include a plurality of rotor and stator discs, not shown, if desired.

In order to urge the friction disc means against the fixed friction surface 26 during a braking operation, the brake structure is provided with a pair of arcuate shoe members 48 and 50 disposed between the friction disc means and the housing end wall 28. The substantially semi-annular shoe member 48 is provided with a radially outwardly projecting ear 52 generally midway between its opposite ends. The ear is provided with an aperture through which a pivot pin 54 extends. As shown, in FIG. 3, the pivot pin 54 has its opposite ends respectively mounted in suitable recesses or seats provided in the housing end walls 24 and 28. The shoe member 48 is pivotally supported by the pin 54 and is also axially slidable on the pin for engaging the friction disc means in the manner described below. The shoe member 50 is provided with a similar apertured ear 56 intermediate its ends, which apertured ear is pivotally and axially slidably carried by a pin 58 which is mounted between the opposite end walls of the housing and radially outwardly of the friction disc means in the same manner as the pin 54.

Cam means are provided between the actuating shoe members 48 and 50 in the housing end wall 28 for urging the shoe members against the friction disc means and thereby urging the friction disc means against the friction surface 26 when the shoe members are pivoted from the retracted or deenergized positions shown in FIG. 1 to the position shown, in part, in FIGS. 2 and 5. These cam means comprise circular dished cam elements or ball seats 60 and 62 mounted in suitable recesses provided in the shoe member 48 at locations equally and arcuately offset from opposite sides of the pivot pin 54. Identical cam elements or ball seats 64 and 66 are provided on the shoe member 50 at locations equally offset from the opposite sides of the pin 58. As indicated in FIGS. 2 and 5, additional identical cam elements or ball seats 68 and 70 are mounted in the housing end wall 28 at locations in axial alignment with the ball seats 64 and 66. Furthermore, identical cam elements or ball seats, not shown, are provided in the housing end wall 28 and in axial alignment with the cam elements 60 and 62 on the shoe member 48.

Wedging elements or balls 72, 74, 76 and 78 are respectively disposed between each pair of aligned and opposed ball seats on the shoe members and housing end wall. When the shoe members are pivoted from their retracted or deenergized position, the balls ride up on the higher portions of the ball seats as shown in FIG. 5 so that the shoe members are urged against the friction disc means to effect a braking action.

It is important to note that all of the cam elements or ball seats are substantially identical and that they are symmetrically arranged at opposite sides of the pivot pins 54 and 58. With this arrangement, all of the wedging elements or balls serve to urge the shoe members axially with substantially the same force or pressure when the shoe members are pivoted. This causes all areas of friction surfaces 80 of the shoe members 48 and 50 to be substantially uniformly urged against the friction disc means so that the friction disc means is uniformly clamped against the housing friction surface 26 around its entire circumference for accomplishing a highly efficient braking action. The substantially uniform application of axially directed forces or pressure to opposite end portions of the shoe members also prevents the shoe members from twisting relative to and binding on the pivot pins 54 and 58. This enables the shoe members to slide freely axially of the pins and further promotes more efficient braking action. In addition, any tendency for the friction disc or the shoes to chatter is eliminated.

Another advantage of the previously described symmetrical arrangement of the cam means at opposite sides of the pivot pins is that self-energization of the brake shoes is promoted during a braking operation. For example, when the friction disc means is rotating in a clockwise direction, as viewed in FIG. 1, frictional engagement of the friction disc means with the shoe member 48 tends to bias the left hand end of the shoe member outwardly and the right hand end of the shoe member inwardly. In other words, engagement of both ends of the shoe member with the friction disc means aids in promoting the self-energizing action.

This embodiment includes means shown in FIGS. 1, 2 and 4, for actuating or pivoting the shoe members in opposite directions for energizing the brake structure. This means comprises a cam member 82 fixed on a rotatable shaft 84 disposed between opposing end portions of the shoe members 48 and 50. Preferably, cam followers in the form of rollers 86 and 88 are mounted by pins 90 and 92 on the ends of the shoe members 48 and 50 respectively for engaging the oppositely facing faces of the cam member 82. The shaft 84 extends from the housing means of the brake structure for connection with any suitable power or manually operable mechanism, not shown, which may be of known construction and which may be used for rotating the shaft 84 in order to energize the brake structure.

In order to return the shoe members 48 and 50 from a pivoted or energized position, to their neutral or deenergized position, a tension spring 94 is connected between ears 96 and 99 projecting inwardly from the shoe members adjacent the cam followers. In addition, tension springs 98 and 100 are connected between the shoe member 48 and the end wall 28 of the housing as shown best in FIGS. 1 and 3 in order to hold the shoe member against the ball elements 72, 74 when the brake structure is deenergized. Similar springs 102 and 104 are connected between the shoe member 50 and the end wall 28 of the housing.

While the preferred embodiment of the present invention has been shown and described herein, it is obvious that many structural details may be changed without departing from the spirit and scope of the appended claims.

The invention is claimed as follows:

1. In a friction device for controlling a rotatable member, the combination comprising fixed means presenting a friction surface and a portion oppositely disposed from said friction surface, a rotatable friction disc adjacent said surface and mountable for rotation with the rotatable member to be controlled and for axial movement relative to said surface, a shoe member disposed between said disc and said portion of the fixed means, means on said fixed means pivotally and axially movably supporting said shoe member between opposite ends of the shoe member, cam means between said shoe member and said portion of the fixed means and at opposite sides of said means supporting the shoe member for urging said shoe member axially against said disc and clamping the disc against said friction surface when said shoe member is pivoted in one direction, and actuating means engageable with the shoe member adjacent one end of the shoe member and pivoting said shoe member.

2. In a friction device for controlling a rotatable member, the combination comprising non-rotatable means presenting a friction surface and a portion generally oppositely disposed from said friction surface, friction disc means adjacent said surface and mountable for rotation with the member to be controlled and for axial movement relative to said surface, an arcuate shoe member substantially concentrically disposed with respect to said disc means and located between said disc means and said portion of the non-rotatable means, pivot means on said non-rotatable means pivotally and axially movably supporting said shoe member between opposite ends of the shoe member, cam means between said shoe member and said portion of the non-rotatable means and arcuately offset from opposite sides of said pivot means for urging said shoe member axially against said disc means and clamping the disc means against said friction surface when the shoe member is pivoted from a deenergized position, and actuating means engageable with said shoe member adjacent one end of the shoe member for pivoting the shoe member.

3. In a friction device for controlling a rotatable member, the combination comprising fixed means presenting an annular friction surface and a portion oppositely disposed from said surface, rotatable friction disc means adjacent said surface and mountable for rotation with the rotatable member to be controlled and for axial movement relative to said surface, a shoe member disposed between said disc means and said portion of the fixed means, a pivot pin on said fixed means and located outwardly of the periphery of said disc means and pivotally and axially movably supporting said shoe member between opposite ends of the shoe member, cam means between said shoe member and said portion of the fixed means and at opposite sides of said pivot pin for urging said shoe member axially against said disc means and clamping the disc means against said friction surface when said shoe member is pivoted away from a deenergized position, and actuating means engageable with the shoe member adjacent one end of the shoe member and pivoting the shoe member.

4. In a friction device for controlling the rotatable member, the combination comprising fixed means presenting an annular friction surface and a portion oppositely disposed from said surface, annular rotatable friction disc means adjacent said surface and mountable for rotation with the rotatable member to be controlled and for axial movement relative to said surface, an arcuate shoe member disposed between said disc means and said portion of the fixed means, pivot means on said fixed means pivotally and axially movably supporting said shoe member generally midway between opposite ends of the shoe member, a pair of cam means between said shoe member and said portion of the fixed means and respectively at opposite sides of said pivot means for urging said shoe member axially against said disc means and clamping of this disc means against said friction surface when said shoe member is pivoted in one direction, each of said cam means comprising circular generally dish shaped seats respectively on said shoe member and on said portion and disposed in opposing relationship, ball elements disposed between opposing seats, and actuating means engageable with one end of the shoe member for pivoting the shoe member.

5. In a friction device for controlling a rotatable member, the combination comprising housing means having oppositely facing axially spaced end walls, one of said end walls presenting an annular friction surface, annular friction disc means disposed adjacent said surface and mountable for rotation with the rotatable member to be controlled and for axial movement relative to said surface, a pair of substantially semi-annular shoe members disposed between said disc means and a second end wall of said housing means and in alignment with said friction disc means, a pair of pivot pins respectively mounted in said housing means outwardly of diametrically opposite portions of said disc means and respectively pivotally and axially movably supporting said shoe members between opposite ends of the shoe members, a pair of cam means disposed between each of said shoe members and said second end wall of the housing means at opposite sides of said pivot pins for urging said shoe members axially against the disc means and clamping the disc means against said friction surface when said shoe members are pivoted, and actuating means disposed between and engageable with a pair of opposed ends of said shoe members for pivoting the shoe members and energizing the brake structure.

References Cited in the file of this patent

UNITED STATES PATENTS

| | | |
|---|---|---|
| 1,762,691 | La Brie | June 10, 1930 |
| 2,071,107 | Blatt | Feb. 16, 1937 |
| 2,373,572 | Lambert | Apr. 10, 1945 |
| 2,669,326 | Kniekamp | Feb. 16, 1954 |
| 2,720,943 | Kershner et al. | Oct. 18, 1955 |
| 2,883,008 | Lucker | Apr. 21, 1959 |
| 2,906,375 | Mossey | Sept. 29, 1959 |
| 2,957,550 | Burnett | Oct. 25, 1960 |
| 2,981,376 | Zeidler | Apr. 25, 1961 |